United States Patent [19]

Graves

[11] Patent Number: 5,239,166
[45] Date of Patent: Aug. 24, 1993

[54] SECURE DATA INTERCHANGE SYSTEM ERASING A CARD MEMORY UPON AN INVALID RESPONSE

[76] Inventor: Marcel A. Graves, 14008 - 80 Avenue, Edmonton, Alberta, Canada, T4R 3J7

[21] Appl. No.: 756,834

[22] Filed: Sep. 9, 1991

Related U.S. Application Data

[63] Continuation of Ser. No. 364,879, Jun. 12, 1989, abandoned.

[30] Foreign Application Priority Data

Jan. 17, 1989 [CA] Canada .................................. 588388

[51] Int. Cl.⁵ ..................... G06K 5/00; G06K 19/067; G06K 9/00
[52] U.S. Cl. .................................. 235/380; 235/492; 902/2; 902/3; 902/26
[58] Field of Search ............... 235/380, 379, 382, 492, 235/487; 902/2, 3, 25, 26

[56] References Cited

U.S. PATENT DOCUMENTS

| | | | |
|---|---|---|---|
| 4,213,038 | 7/1980 | Silverman et al. | 235/382 |
| 4,328,414 | 5/1982 | Atalla | 235/380 |
| 4,510,382 | 4/1985 | Walter | 235/380 |
| 4,532,508 | 7/1985 | Ruell | 340/825.34 |
| 4,549,075 | 10/1985 | Saada et al. | 235/380 |
| 4,582,985 | 4/1986 | Lofborg | 902/3 |
| 4,601,011 | 7/1986 | Grynberg | 902/2 |
| 4,605,844 | 8/1986 | Haggan | 235/380 |
| 4,636,622 | 1/1987 | Clark | 235/380 |
| 4,710,613 | 12/1987 | Shigenaga | 235/380 |
| 4,742,573 | 5/1988 | Popouic | 235/454 |
| 4,746,788 | 5/1988 | Kawana | 235/380 |
| 4,755,940 | 7/1988 | Brachtl et al. | 235/382 |
| 4,757,543 | 7/1988 | Tamada et al. | 235/380 |
| 4,766,433 | 8/1988 | Herman et al. | |
| 4,783,823 | 11/1988 | Tasaki et al. | 235/380 |
| 4,795,893 | 1/1989 | Voon | 235/382 |
| 4,803,351 | 2/1989 | Shigenaga | 235/380 |
| 4,808,802 | 2/1989 | Kano | 235/380 |
| 4,827,111 | 5/1989 | Kondo | 235/380 |
| 4,995,086 | 2/1991 | Lilley et al. | 235/380 |

Primary Examiner—Eugene R. LaRoche
Assistant Examiner—Christopher R. Glembocki
Attorney, Agent, or Firm—Robert M. Phipps

[57] ABSTRACT

Systems for interchanging information, for example, obtaining cash from a terminal by use of a portable device such as a credit card are well-known but suffer from being vulnerable to fraud. In the invention a highly secure information interchange system is achieved by utilizing an intelligent card as the portable device which verifies that the terminal is a valid one and the terminal in turn verifies that the card is valid. Unauthorized users are screened out by means of a physical characteristic scan of the user such as a fingerprint which is then compared with comparable data stored on the portable device. If an invalid terminal attempts to communicate with the card, the card erases the data and programs from its memory. All programs and data in the terminal are stored in memory which loses its contents when power is interrupted, thus improving the security of the system by making unauthorized use of a terminal very difficult. The terminal can only be brought back up by authorized personnel with their own access portable devices. Both a system and a method are claimed.

21 Claims, 2 Drawing Sheets

SECURE DATA INTERCHANGE SYSTEM ERASING A CARD MEMORY UPON AN INVALID RESPONSE

This is a continuation of application Ser. No. 07/364,879, filed Jun. 12, 1989, now abandoned.

FIELD OF THE INVENTION

This invention relates generally to a system and method of providing information and services to a population of persons through portable devices which can be used to access any of a number of terminals to make use of the services offered at the said terminals. The system and method in particular provide for security against unauthorized access. The invention has use in the fields of automatic banking, automatic credit and debit transactions, passport and travel visa verification, health and medical records, security access, licensing and any other like field where fraud may pose a problem.

BACKGROUND OF THE INVENTION

Data transfer systems using portable devices such as cards with some memory capability, for example, a magnetic strip, and terminals to which the portable devices can be connected are well known. Generally they are used to control access to some area or service. Usually the terminals are connected to a central processing unit or computer which controls access and is the ultimate storage facility for the information on the card.

British Patent 1504196 to Moreno describes such a prior art system comprised of a portable device and a peripheral device or terminal which is connected to a central computer. Many of the portable devices referred to as prior art in Moreno used magnetic track memories which could easily be modified or the contents read. Also the memory storage capacity was quite low and the memory was susceptible of accidental modification. This left such systems vulnerable to abuse from fraudulent intervention.

U.S. Pat. No. 3,702,464 addressed the problem of lack of memory capacity and volatility by disclosing a portable device containing an integrated circuit memory. The device still suffered from the problem that the memory could be read and the contents extracted or changed. Moreno advanced the art by adding inhibiting means to prevent the transfer of data out of or into prohibited areas of the memory of the portable device. Preferably the portable device contained its own inhibiting means but the inhibiting means could be contained in the peripheral device.

In British Patent 1505715 to Moreno there is disclosed a system for interchanging information which is like those described above, but without the error prone direct connections from the periperal devices connected to the central computer. The peripheral devices contained a write mechanism which could transfer the information from the portable device to the peripheral device which could in turn write the information on a second portable device. These second portable devices would then be collected on some regular basis and taken to the central computer where the information would be transfered to the central computer's memory.

Canadian Patent 1207460 to Ugon discloses a method and apparatus for authorizing access to a service offered by an authorizing entity. The system comprises a portable card with memory and a microprocessor, and an authorizing entity system capable of communicating with the card and also performing computer program operations. The card and the system have the same algorithm to be executed and each has secret data upon which the algorithms operate to produce a result which can be compared to ensure that proper access is granted. This system is rather complicated and involves an operator at the authorizing entity end.

It is also known to encode a fingerprint on a portable card to verify the identity of the user. UK Patent Application GB 2185937 A of O'Shea et al discloses a credit or similar card which incorporates a computer generated image of the fingerprint of the authorized user. When a transaction is to be verified the user's finger print is scanned by a finger print reader and the result is compared with the information on the card. The user is authorized to have access if the prints match. Such devices are presently commercially available.

The systems described above suffer from the problem of complexity or they are susceptible to fraudulent and unauthorized access and tampering with the information in the card or the terminal. The present invention provides an apparatus and method for providing a highly secure and highly fraudproof system for providing access to services of an authorizing entity.

SUMMARY OF THE INVENTION

The invention provides an improvement over previous systems and methods of authorizing access to services in a card-terminal environment by providing for a system of protection and authorization which makes the system highly fraud-proof. The system is comprised of a portable device such as a card, a peripheral device such as a terminal, and optionally, a remote host computer in the case of large systems, although it can be seen that the host computer is not necessary for an operational system. These components are connected via some communication medium such as electrical connectors or optics or radio transmission. The terminal contains a microprocessor or some such logic device and memory, a card reading device and a finger print scanner. The card contains a microprocessor or some such logic device and memory, which can be connected to the terminal via electronic or some other means such as optics or radio transmission. The card and terminal each have their own data and programs. Upon insertion of the card into the reader a process of verification is carried out by means of the microprocessors or logic units, the programs and data in the memories. The card verifies that the terminal is valid, the terminal verifies that the card is valid and the user is verified by means of a finger print scan and comparison with finger print data previously recorded in the card. This is not to say that some other form of physical characteristic could not be used such as retinal or DNA scan. Where data is being transmitted between components of the system encoding and decoding is used to further enhance the security of the system.

The invention comprises a system for the interchange of information comprising at least one portable electronic device; at least one terminal device; communication means connecting the portable device with the terminal device; the portable device containing verification means to verify that the terminal device is a valid one; the terminal device containing verification means to verify that the portable device is a valid one and further verification means to verify that the user is authorized to use the system; protection means to prevent tampering with a terminal and encryption means to encode and decode data at the interfaces between the portable device and the terminal device.

The invention also consists of a method of preventing unauthorized access to a system comprised of a plurality of portable devices, a plurality of terminal devices and a communication link connecting the said terminal devices to a central host computer wherein the said portable device contains information identifying the said portable device as well as the authorized user, when the said terminal is connected to the said portable device and power is supplied to the said portable device the terminal device queries the portable device to determine if it is a valid portable device, if not the portable device is retained or rejected by the terminal, in turn the portable device queries the terminal to determine if the terminal is a valid terminal, if not the portable device erases its memory and becomes harmless, the terminal in turn scans a physical characteristic of the user and compares that information with stored information on the portable device to determine if that user is authorized to use the portable device and the terminal, if the portable device and terminal are valid and the user is authorized access is allowed to the service, if not the card is retained or rejected; when the power to the terminal is interrupted the terminal programs and data are lost and can only be reloaded by authorized personnel with their access portable devices or from the host computer; encryption is used at the portable device and terminal interface as well as at the terminal and host computer interface.

BRIEF DESCRIPTION OF THE DRAWINGS

In drawings which illustrate embodiments of the inventions.

DESCRIPTION OF THE PREFERRED EMBODIMENT

Figure 1:
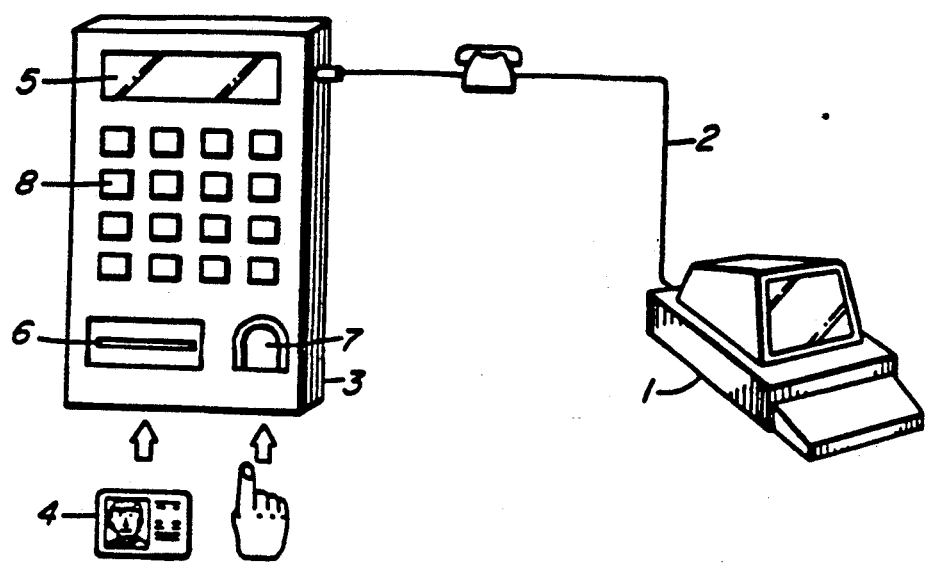
FIG. 1 is a pictorial representation of the basic system components, including an optional host computer

The combining of the capability of an intelligent card co-operating with an intelligent terminal, a finger print scanning device, and optionally interfacing with a host computer to ensure maximum possible protection for a card user and a card issuer, is very desirable. In FIG. 1 the basic hardware configuration needed to implement such an idea is set out in pictorial form. The host computer system 1 can be a personal computer, mini-computer, mainframe or any suitable computer configuration depending upon the particular application. The host computer system is connected to terminal 3 by suitable linkages such as a telephone line through a modem. It is also possible to utilize other linkages such as radio transmission, or direct cable or optics. Terminal 3 is described as an intelligent terminal and comprises an output device such as a display 5, or a voice synthesizer or other means of communication with the user, a card reader 6 for reading or writing information from or to the card 4. It also contains an input device 8 such as a keyboard or other means of inputting information to the terminal and a finger print scanning device 7 or some other device to obtain physical information about the user.

When a user wishes to utilize a card to gain access to a service from a terminal, the system requires a unique verification procedure to be implemented. Upon insertion of the card into the terminal, the terminal itself is verified by the card. The card is then verified by the terminal and then the user's finger print which has been digitized into the card at the time of issue is compared with the finger print which is submitted via the finger print scanning device at the time of use. Additional user identification such as a personal identification number can also be included.

If the terminal into which the card is inserted is not a valid terminal the card will erase its memory rendering itself useless to any would-be unauthorized user.

An invalid card will be retained by the terminal and retrieved by authorized personnel. If the finger prints don't match the card is retained, otherwise access is granted to the service offered by the terminal.

Figure 2:
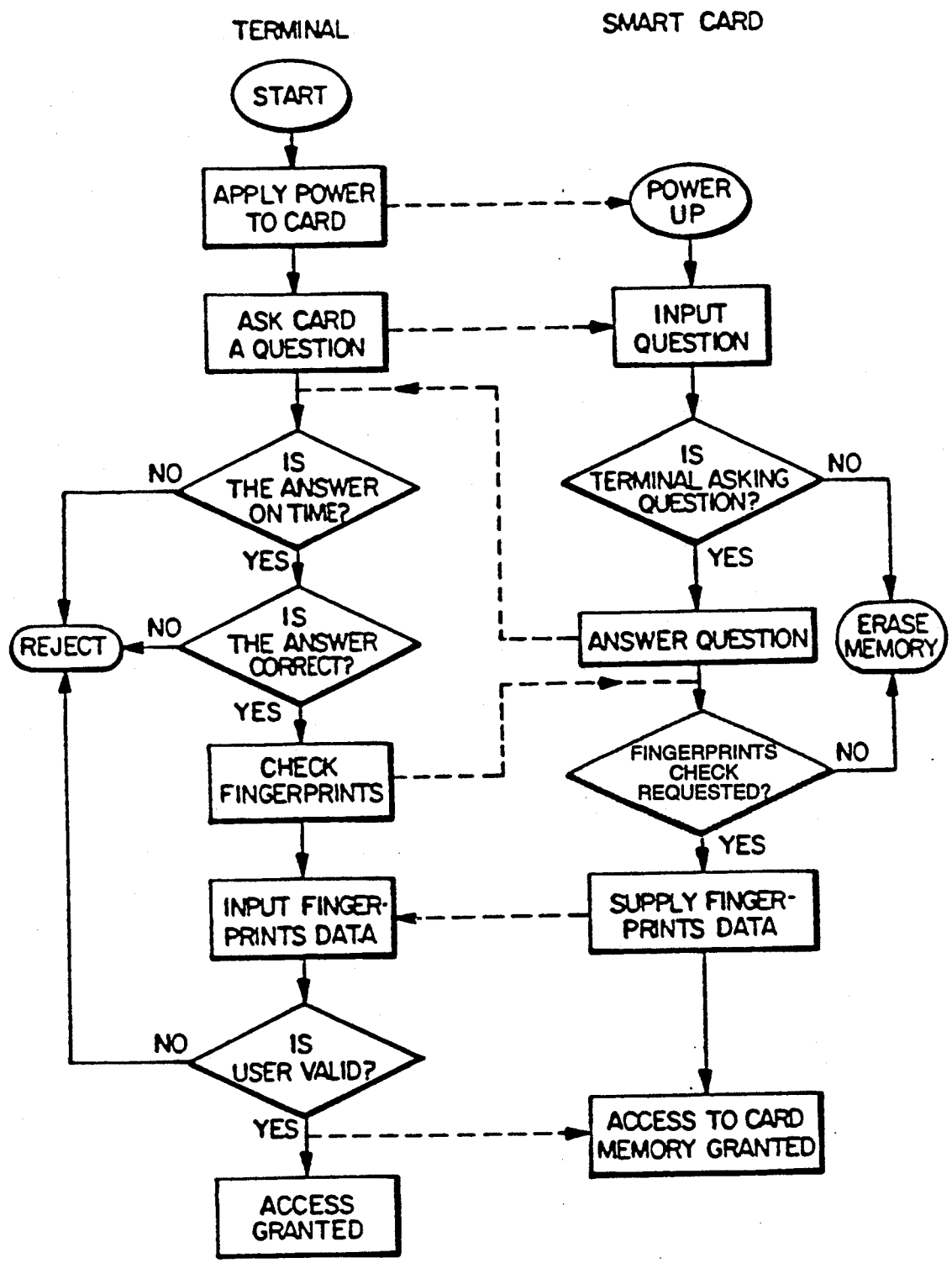
FIG. 2 is a flow chart depicting the dialog between the card and the terminal.

FIG. 2 is a detailed flow chart depicting the above sequence of verification. In the preferred embodiment the card is an "intelligent card" with its own microprocessor or logic unit, memory, data and programs. In the preferred embodiment it is envisaged that the card will not carry its own power supply but will be connected to the terminal's power supply when the card is inserted. However, it may be preferable in some cases for the card to have its own power supply.

The whole process will start with the card's insertion into the terminal reader.

The verification process, then, shall start on the terminal side by generating a terminal verification message or question directed to the card. On the card side, the checkout is accomplished by simply waiting for a certain period of time for the terminal's question. If the question does not arrive, the card will destroy all information in its memory and become useless.

If one assumes that the card and the terminal are the correct ones, the parallel processing of the input question must proceed on both the terminal and card sides. On the terminal side, the checking of the card is achieved similarly to the card's check by waiting for the card verification message or answer for a certain period of time. If the answer does not arrive, the terminal can withhold the card or reject it. If the answer does arrive it will process it.

The invention can be configured to use different types of cards for different applications. For example:
1) Passport cards
2) Credit cards
3) Security access cards
4) Licence cards
5) Debit cards Different types of cards would produce different answers to the initial question. This would be the way the terminal recognizes the type of card it is dealing with. If the answer from the card arrives on time, the terminal would sort the answer to the proper application and proceed by checking if the answer is correct. In the negative case, it would, again, withhold or reject the card.

The next stage is the verification process in which identity of the card user is verified. This is done through a process of finger print checkout, in which the terminal transmits a user identification instruction message to the card. The person's finger prints are scanned and compared with the template received from that stored on the card. Again, if any attempt is made to read the data from the card memory before the finger print verification process is completed, the card will destroy its data.

The card will only allow access to its memory after confirmation from the terminal that the user is permitted to use it.

It is unlikely that the whole verification process will take any longer than approximately 25 seconds although the timing is not critical.

It is possible that someone could try to gain access to the data or the software itself by tampering with the terminal. To prevent this, all terminal software could be placed on RAM memory only. This way it would be lost immediately if the power to the terminal is disrupted. Only a licensed technician with his own access portable device would be able to download new software either from his portable device or from the host computer, and bring the terminal up again.

Figure 3:
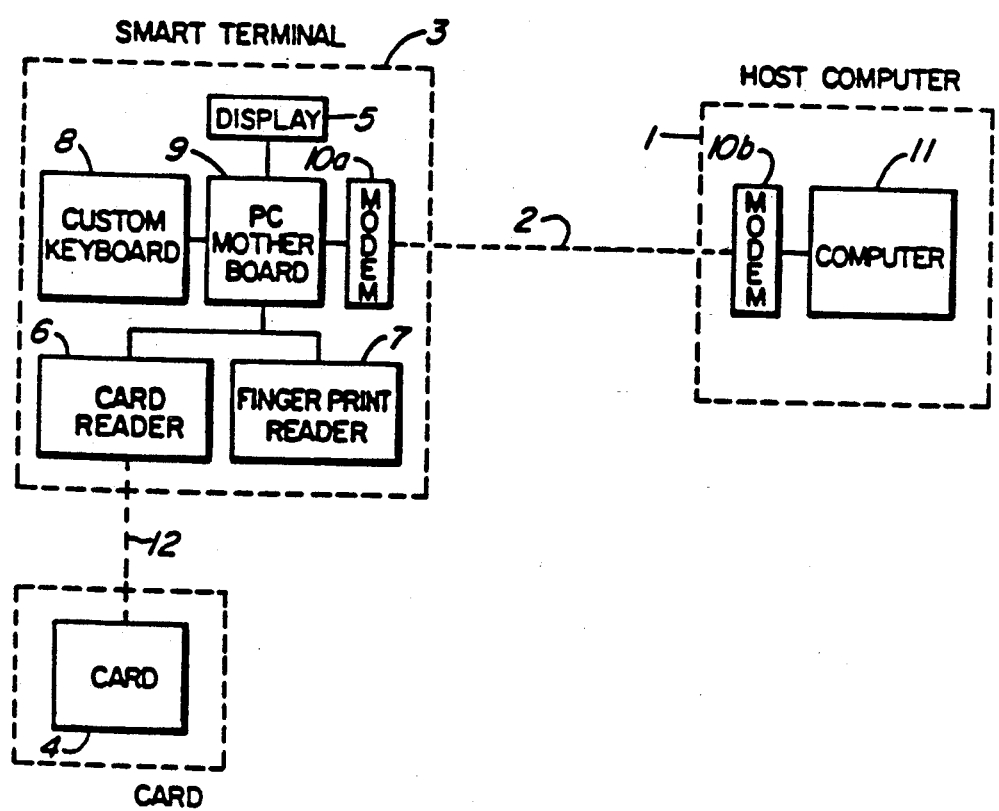
FIG. 3 is a block diagram illustrating hardware configuration.

The block diagram of FIG. 3 shows the hardware configuration of a preferred embodiment of a simple system comprised of only one terminal. The host computer system 1 is remotely located from the terminal 3. The two are connected by way of a telephone line 2 and modems 10a and 10b. The terminal 3 is composed of a PC-type motherboard 9, which includes a microprocessor or other logic device and memory, an "intelligent card" reader 6, a finger print scanner 7, a custom keyboard 8 and a display 5. The card reader 6 is adapted to receive and communicate with the "intelligent card" 4. The "intelligent card" typically contains a microprocessor or some other logic device and memory. Appropriate software and data are stored in the terminal 3 and in the "intelligent card" 4 to enable the verification procedures represented by the flow chart of FIG. 2 to be carried out.

"Intelligent cards" are a unique technology utilizing plastic or some other media in which to embed microprocessor or some such logic unit and memory chips. The cards accordingly have both memory and processing capabilities. Essentially they are pocket sized computer systems with a wide range of application possibilities.

A number of off-the-shelf items can be used in the system. The terminal could use an IBM PC ™ motherboard, a Toshiba ™ FZ1318 card reader and an IDENTIX Touchsave ™ T5-500 finger print scanner. The "intelligent card" could be a Toshiba TOSMART ™ CZ-3000. Typically an IBM PC ™ could be used as the host computer but larger more complex systems using many terminals may require a larger computer such as a mainframe.

Interconnections other than telephone lines and modems are possible. For example a security system for a building may have dedicated communication cables connecting the various terminals to the host computer without the use of modems. Also radio and optical interconnections are possible.

Finally to further enhance security an encryption technique could be used to encode data before transmitting between the host computer and the terminal, and decoding upon receipt. Similarily encoding and decoding could be used when reading and writing from and to the "intelligent card".

A number of changes and modifications apparent to one skilled in the art can be made without departing from the invention.

The embodiments of the invention in which an exclusive property or privilege is claimed are defined as follows:

1. An electronic card for use in a secure data interchange system having a terminal adapted to receive and communicate with said electronic card, said card having means for communicating with said terminal and having a memory for storing program algorithms and data therein including valid terminal verification data and valid user identification request data; said electronic card comprising:

means for monitoring, for a predetermined period of time, immediately following insertion of said card in said terminal, an output from said terminal for a terminal verification message and being operable to erase said memory when said terminal verification message is not received within said predetermined period of time and being responsive to said terminal verification message received within said predetermined period of time, by comparing said received terminal verification message to said stored valid terminal verification message and being operable to erase said memory when said received terminal verification message is not valid; and means for monitoring, following receipt of a valid terminal verification message, the output from said terminal for a user identification request and being responsive to said user identification request by comparing said received user identification request to said stored valid user identification request and being operable to erase said memory when said user identification request is not valid and being operable to erase said memory when said received request is an attempt to read data from said memory before receipt of said valid user identification request.

2. A card as defined in claim 1, wherein each of said means for monitoring is a microprocessor.

3. A card as defined in claim 1 or 2, said memory including prestored information indicative of a predetermined user of said card and said means for monitoring, following receipt of a valid terminal verification message being operable to read said predetermined user information from said memory and being operable to transmit to said terminal said predetermined user information, upon receipt of said valid user identification request.

4. An electronic card for use in a secure data interchange system having a terminal adapted to receive and communicate with said electronic card, said card comprising:

means for communicating with said terminal;

memory for storing program algorithms and data therein including valid terminal verification data, valid user identification request data, and information indicative of a predetermined user of said card;

means for monitoring, for a predetermined period of time, immediately following insertion of said card in said terminal, an output from said terminal for a terminal verification message and being operable to erase said memory when said terminal verification message is not received within said predetermined period of time and being responsive to said terminal verification message received within said predetermined period of time, by comparing said received terminal verification message to said stored valid terminal verification message and being operable to erase said memory when said received terminal verification message is not valid;

means for monitoring, following receipt of a valid terminal verification message, the output from said terminal for a user identification request and being responsive to said user identification request by comparing said received user identification request to said stored valid user identification request and being operable to erase said memory when said user identification request is not valid identification instruction message and being operable to erase said memory when said received request is an attempt to read data from said memory before receipt of said valid user identification request;

each of said means for monitoring is a microprocessor; and said means for monitoring, following receipt of a valid terminal verification message, being operable to read said predetermined user information from said memory and being operable to transmit to said terminal said predetermined user information, upon receipt of said valid user identification request.

5. A card as defined in claim 4, said microprocessor including a computer program.

6. A card as defined in claim 4, said predetermined user information being indicative of a physical characteristic of an authorized user of the card.

7. A card as defined in claim 6, said physical characteristic is a computer generated image of a finger print pattern of said authorized user of said card.

8. A card as defined in claim 4, 5, 6, or 7, including means for receiving power, from said terminal, upon insertion of said card in said terminal.

9. A method for providing a secure electronic card for use in a data interchange system, wherein a terminal is adapted to receive and communicate with the electronic card and wherein said card has means for communicating with said terminal and a memory for storing data and program algorithms therein including valid terminal verification data and valid user identification request data, said method comprising:

monitoring by said card for a predetermined period of time, immediately following insertion of said card in said terminal, an output from said terminal for a terminal verification message;

erasing said memory when said terminal verification message is not received within said predetermined period of time, and comparing said terminal verification message received within said predetermined period of time to said stored valid terminal verification message, and erasing said memory when said terminal verification message is not valid;

monitoring by said card, following receipt of a valid terminal verification message, the output from said terminal for a user identification request from said terminal and comparing said received user identification request to said stored valid user identification request; and erasing said memory when said user identification request is not valid, and erasing said memory when said request is an attempt to read data from said memory before receipt of a valid user identification request.

10. A method as defined in claim 9, including transmitting to said terminal a card verification message for verification of said card by said terminal, following receipt, within said predetermined period of time, of said valid terminal identification message.

11. A method as defined in claim 9, said card including information, prestored therein, indicative of a predetermined user of said card, said method including:

reading said stored predetermined user information from said memory; and transmitting said predetermined user information to said terminal, upon receipt of a valid user identification request, for verification by said terminal of said user.

12. A method for providing a secure electronic card for use in a data interchange system, wherein a terminal is adapted to receive and communicate with the electronic card and wherein said card has means for communicating with said terminal and a memory for storing data and program algorithms therein including valid terminal verification data and valid user identification request data, said method comprising:

monitoring by said card for a predetermined period of time, immediately following insertion of said card in said terminal, an output from said terminal for a terminal verification message;

erasing said memory when said terminal verification message is not received within said predetermined period of time, and comparing said terminal verification message received within said predetermined period of time to said stored valid terminal verification message, and erasing said memory when said terminal verification message is not valid;

monitoring by said card, following receipt of a valid terminal verification message, the output from said terminal for a user identification request from said terminal and comparing said received user identification request to said stored valid user identification request;

erasing said memory when said user identification request is not valid, and erasing said memory when said request is an attempt to read data from said memory before receipt of a valid user identification request;

transmitting to said terminal a card verification message, following receipt, within said predetermined period of time, of said valid terminal identification message for verification of said card by said terminal;

storing information indicative of a predetermined user of said card, in said card memory; and transmitting said predetermined user information to said terminal upon receipt of a valid user identification request, for verification by said terminal of said user.

13. A system for the secure interchange of information comprising:

at least one portable electronic card having a memory for storing program algorithms and data therein including valid terminal verification data and valid user identification request data;

at least one terminal device adapted to receive and communicate with said portable electronic card;

said card including:

means for communicating with said terminal;

means for monitoring, for a predetermined period of time, immediately following insertion of said card in said terminal, an output from said terminal for a terminal verification message and being operable to erase said memory when said terminal verification message is not received within said predetermined period of time, and being responsive to said terminal verification message received within said predetermined period of time, by comparing said received terminal verification message to said stored valid terminal verification message and being operable to erase said memory when said received terminal verification message is not valid; and means for monitoring, following receipt of a valid terminal verification message, the output from said terminal for a user identification request and being responsive to said user identification request by comparing said received user identification request to said stored valid user identification request and being operable to erase said memory when said user identification request is not valid and being operable to erase said memory when said received request is an attempt to read data from said memory before receipt of said valid user identification request.

14. A system as defined in claim 13, said terminal comprising:

terminal memory having a valid card verification message stored therein;

means for transmitting to said output said terminal verification message, upon insertion of said card in said terminal; means for monitoring, for a second predetermined period of time a card output for receipt of a card verification message and being operable to reject said card when said card verification message is not received within said second predetermined period of time, and being responsive to said card verification message received within said second predetermined period of time by comparing said received card verification message to a stored valid card verification message, and being operable to reject said card when said received card verification message is invalid;

means for reading a user identification from said user following receipt of a valid card verification message; and means for transmitting to said output a user identification request, and means for monitoring said card output for receipt of said predetermined user information and being responsive to said predetermined user information for comparing said received predetermined user information to said read user identification, and being operable to reject said card when said predetermined user information is invalid.

15. A system as defined in claim 14, said card including means for transmitting to said terminal, following receipt of valid terminal verification message, a card verification message.

16. A system as defined in claim 14, said means for reading is a scanning device for scanning a physical characteristic of said user.

17. A system as defined in claim 16, said physical characteristic is a finger print pattern.

18. A system as defined in claim 13, said card including means for transmitting to said terminal, following receipt of valid terminal verification message, a card verification message.

19. A system as defined in claim 13, 14 or 18, including protection means associated with said terminal to prevent tapering with said terminal.

20. A system as defined in claim 19, said protection means including a volatile memory which looses its contents when power is interrupted to said memory.

21. A system for the secure interchange of information comprising:

at least one portable electronic card having a memory for storing program algorithms and data therein including valid terminal verification data and valid user identification request data;

at least one terminal device adapted to receive and communicate with said portable electronic card;

said card including:

means for communicating with said terminal;

means for monitoring, for a predetermined period of time, immediately following insertion of said card in said terminal, an output from said terminal for a terminal verification message and being operable to erase said memory when said terminal verification message is not received within said predetermined period of time, and being responsive to said terminal verification message received within said predetermined period of time, by comparing said received terminal verification message to said stored valid terminal verification message and being operable to erase said memory when said received terminal verification message is not valid; and means for monitoring, following receipt of a valid terminal verification message, the output from said terminal for a user identification request and being responsive to said user identification request by comparing said received user identification request to said stored valid user identification request and being operable to erase said memory when said user identification request is not valid and being operable to erase said memory when said received request is an attempt to read data from said memory before receipt of said valid user identification request;

means for transmitting a card output, following receipt of valid terminal verification message within said predetermined period of time, a card verification message;

said terminal including:

terminal memory having a valid card verification message stored therein;

means for transmitting to said output said terminal verification message, upon insertion of said card in said terminal; means for monitoring, for a second predetermined period of time a card output for receipt of a card verification message and being operable to reject said card when said card verification message is not received within said second predetermined period of time, and being responsive to said card verification message received within said second predetermined period of time by comparing said received card verification message to a stored valid card verification message, and being operable to reject said card when said received card verification message is invalid;

means for reading a user identification from said user following receipt of a valid card verification message; and means for transmitting to said output a user identification request, and means for monitoring said card output for receipt of said predetermined user information and being responsive to said predetermined user information for comparing said received predetermined user information to said read user identification, and being operable to reject said card when said predetermined user information is invalid.

* * * * *